United States Patent
Hirano

(10) Patent No.: US 8,155,762 B2
(45) Date of Patent: Apr. 10, 2012

(54) INSTRUMENTATION CONTROL SYSTEM

(75) Inventor: Yukiko Hirano, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 669 days.

(21) Appl. No.: 12/253,547

(22) Filed: Oct. 17, 2008

(65) Prior Publication Data

US 2009/0105847 A1    Apr. 23, 2009

(30) Foreign Application Priority Data

Oct. 17, 2007    (JP) ................................. 2007-269618

(51) Int. Cl.
*G05B 11/01* (2006.01)
(52) U.S. Cl. .................. 700/19; 700/7; 700/23; 700/26; 700/79
(58) Field of Classification Search .................. 700/7–9, 700/19, 23, 26; 714/39
See application file for complete search history.

(56) References Cited

U.S. PATENT DOCUMENTS

| | | | |
|---|---|---|---|
| 4,720,782 A * | 1/1988 | Kovalcin | 700/83 |
| 5,032,978 A | 7/1991 | Watson et al. | |
| 7,730,363 B2 | 6/2010 | Takezawa et al. | |
| 2008/0059840 A1 | 3/2008 | Takezawa et al. | |
| 2009/0157214 A1 * | 6/2009 | Mori | 700/110 |

FOREIGN PATENT DOCUMENTS

| | | |
|---|---|---|
| JP | 2896306 B2 | 3/1999 |
| JP | 2001 094620 A | 4/2001 |
| JP | 2001-211232 A | 8/2001 |
| WO | WO9610288 | 4/1996 |
| WO | WO 2006035931 | 4/2006 |

OTHER PUBLICATIONS

Office Action in corresponding German Patent Application No. 10 2008 050 634.6 dated Jan. 11, 2012 and English-language translation, 11 pps.

* cited by examiner

*Primary Examiner* — Kakali Chaki
*Assistant Examiner* — Nathan Laughlin
(74) *Attorney, Agent, or Firm* — Buchanan Ingersoll & Rooney PC

(57) ABSTRACT

In an instrumentation control system in which plural control devices are connected to each other through a network, and transfer of data is performed asynchronously, a reset switch is provided in one of a control device, and when this switch is depressed, an instruction to reset unreliable information in the respective control devices is transmitted to other control devices, the control device having transmitted the instruction and all the other control devices having received the instruction stop the reception of the unreliable information from the network for a definite period, the unreliable informations in the respective control devices are reset, and the unreliable informations in the whole network are reset.

5 Claims, 11 Drawing Sheets

PRIOR ART

INSTRUMENTATION CONTROL SYSTEM

BACKGROUND OF THE INVENTION

1. Field of the Invention

The present invention relates to an instrumentation control system in which attached information is transferred between control devices which are connected to a network and operate asynchronously.

2. Description of the Background Art

In general, in some of the various plants, a measurement control system is adopted in which a control device is provided in each of facilities, various control arithmetic processings are performed based on data measured by a measurement equipment to control each of the facilities, the arithmetic results thereof are transferred to a control device on the center side through a network, the control device on the center side monitors the state of the facilities of whole plant based on the arithmetic results, and the results of monitoring thereof are transferred to the control device of each of the facilities so that each of the facilities is feedback-controlled.

Besides, a dispersed processing system is also adopted in which plural control devices are provided in parallel for each of facilities, the respective control devices are connected to each other through a network, and the control of each of the facilities is shared by the plural control devices.

In the system as stated above, transfers of data are frequently performed asynchronously between the control devices in such a way that data obtained by the control arithmetic processing performed by one control device is transmitted to another control device, and another control device executes a specified control arithmetic operation based on the data, and transmits the arithmetic result thereof to next control device.

Here, when an abnormal transition phenomenon (for example, excessive change of pressure, flow rate, or temperature) occurs in each facility of the plant, the data measured by the measurement equipment is not reliable, and accordingly, the arithmetic result of the control device based on the measurement data is also not reliable.

The arithmetic data as stated above is transmitted to another control device, and when another control device performs an arithmetic operation based on the unreliable arithmetic data, the next arithmetic processing result also becomes unreliable.

In the case where the operation result becomes unreliable due to the abnormal transition phenomenon as stated above, when the arithmetic processing data is transmitted to another control device, as shown in FIG. 2, each control device adds unreliable information (for example, an unreliability flag "1") to notify that the control operation result of each control device using this unreliable data is also unreliable, and mutual attentions are exchanged.

In the related art, a plant diagnosis method is proposed in which when an abnormal transition phenomenon occurs in each facility of a plant, an observation signal of the starting point of the transition change and a passage of the transition change in the observation signal are estimated, cause candidates are narrowed, and support is performed so that the cause of occurrence of unreliability can be quickly removed (see, for example, patent document 1).

[Patent document 1] Japanese Patent No. 2896306

In the related art disclosed in patent document 1, the cause of the occurrence of the unreliability such as the abnormal transition phenomenon is diagnosed and the countermeasures can be quickly taken. However, there is a problem that the unreliable informations are kept continuously transmitted among the control devices even after the causes of the unreliability are substantially removed.

That is, as a simple model, for example, when a closed loop of feedback control or the like is formed between two control devices A and B, even if the abnormal transition phenomenon to cause the unreliability is already removed in the control device A, since the unreliable information is added to data which was transmitted from the device A to the device B before that, data subjected to arithmetic processing in the device B based on this data becomes unreliable.

Accordingly, unreliable information is added also to the data fed back from the device B to the device A.

Further, unreliable information is added also to the result of arithmetic processing in the device A.

As stated above, there occurs a disadvantage that when the unreliable information is once added, the unreliable information is kept continuously transmitted between the control devices A and B.

When synchronous transmission is performed between control devices, it is relatively easy to cause reset timings of unreliable information to coincide with each other. However, when it is assumed that asynchronous transmission is performed between control devices, it is not simple to reset the unreliable information remaining in the closed loop.

As a countermeasure for removing the disadvantage as stated above, it is conceivable that a reset switch to reset the unreliable information is provided for each control device, and all reset switches are depressed at the same timing in the respective control devices to reset the unreliable information remaining in the closed loop between the devices.

When two control devices are adjacently disposed, it is possible to depress the reset switches at the same time. However, since the respective control devices are generally installed at places apart from each other through a network, even if operators communicate with each other, it is difficult to cause the timings of depressing the reset switches to coincide with each other completely. Accordingly, it is very difficult to reset the unreliable information remaining in the closed loop.

Besides, even in the case of taking a countermeasure to stop transmission of unreliable information unconditionally at the loop inlet so that the unreliable information is not transmitted in a closed loop formed between control devices, because of differences in application change timings of the respective devices or reconstruction timings, it is difficult to ensure an opportunity to extract a portion forming the closed loop after data of all devices are inputted.

SUMMARY OF THE INVENTION

The invention has been made to solve the above problems, and it is an object to provide an instrumentation control system in which when data is asynchronously transferred between control devices, a disadvantage that unreliable information is kept continuously transmitted in a closed loop of the control devices can be eliminated simply and certainly.

In order to achieve the object, in an instrumentation control system constructed such that plural control devices to perform various control arithmetic processings are connected through a network, the respective control devices perform data transmission through the network asynchronously with each other, and unreliable information to distinguish whether a result of the control arithmetic processing is reliable or not is added at the time of data transmission, the following structure is adopted.

That is, according to the invention, one of the control devices includes a reset switch, a reset instruction output unit to output an unreliability reset instruction to reset the unreliable information to the network for a definite period in response to an operation of the reset switch, and an unreliable information reset unit to stop input of the unreliable information from the other control device to the one control device for a definite period in response to the operation of the reset switch and to reset the unreliable information in the one control device, and the other control device includes a reset instruction reception monitor unit to monitor whether the unreliability reset instruction is received through the network or not, and an unreliable information reset unit to stop, when the unreliability reset instruction is received, input of the unreliable information from another control device to the one control device for a definite period in response to the instruction and to reset the unreliable information in the one control device.

Besides, according to the invention, in an instrumentation control system constructed such that plural control devices to perform control arithmetic processings are connected to each other through a network, the respective control devices perform data transmission through the network asynchronously with each other, and unreliable information to distinguish whether a result of the control arithmetic processing is reliable or not is added at the time of data transmission, each of the control devices includes an unreliable information monitor unit to monitor whether unreliable information is to be added to output data from own control device to the network or not, a reset instruction reception monitor unit to monitor whether an unreliability reset instruction to reset unreliable information is received from the other control device through the network or not, a reset instruction output unit to output the unreliability reset instruction to the network when unreliable informations are detected by the unreliable information monitor unit continuously for a definite time, and an unreliable information reset unit to stop input of unreliable information from the other control device to the onr control device for a definite period and to reset the unreliable information in own control device after the reset instruction output unit of own control device outputs the unreliability reset instruction to the network, or when the reset instruction reception monitor unit detects that the unreliability reset instruction is received through the network.

According to the invention, in the system structure in which data are asynchronously transferred between the control devices connected to each other through the network, when the closed loop is formed between the control devices, the input of the unreliable informations added to the transmission data from the other control device are stopped for the definite period according to the unreliability reset instruction, and the unreliable information in own control device is reset, and accordingly, all unreliable information can be certainly reset. Thus, it becomes possible to certainly eliminate the disadvantage that the unreliable information is kept continuously transmitted in the closed loop.

Besides, according to the invention, the control device to issue the unreliability reset instruction is not limited to a specific device, and the unreliability reset instruction can be outputted from an arbitrary control device 1a or 1b as the starting point of occurrence of the unreliable information. Thus, even when there occurs a state in which a specific control device is removed from the network due to the failure or maintenance, the reset of unreliable information can be automatically and certainly performed for the closed loop of the remaining control devices. Besides, in the hierarchized network, it is supposed that there occurs a state in which the network is divided into plural networks. Also in such a case, since the control device to issue the unreliability reset instruction is not limited to a specific device, it becomes possible to avoid such a state that the reset of the unreliable information in the closed loop formed on the divided network can not be performed, and the convenience is high.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

Embodiments of the present invention will be described with reference to the drawings. In the following embodiments, for facilitating the understanding of the invention, a description will be made using, as an example, a case where two control devices are provided. However, the invention is not limited to this, but can be applied also to a case where three or more control devices are provided.

Embodiment 1

Figure 1:
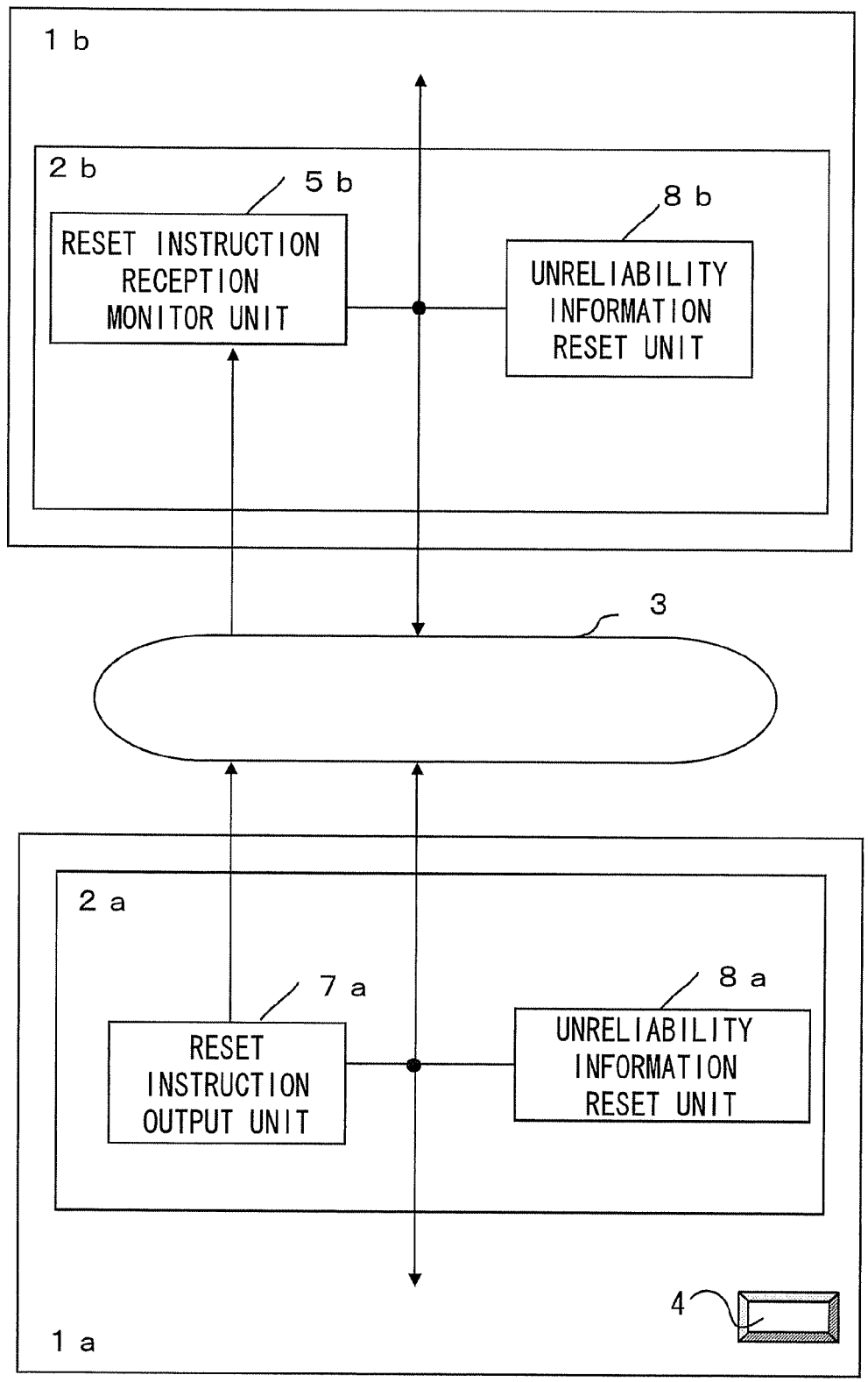
FIG. 1 is a structural view of an instrumentation control system in embodiment 1 of the invention.

FIG. 1 is a structural view of an instrumentation control system in embodiment 1 of the invention.

In the instrumentation control system of embodiment 1, plural (two in this embodiment) control devices 1a and 1b to execute various control arithmetic processings are connected to each other through a network 3.

The respective control devices 1a and 1b include arithmetic control sections 2a and 2b to perform various logical arithmetic operations, and the respective arithmetic control sections 2a and 2b perform data transmission through the network 3 asynchronously with each other.

Figure 2:
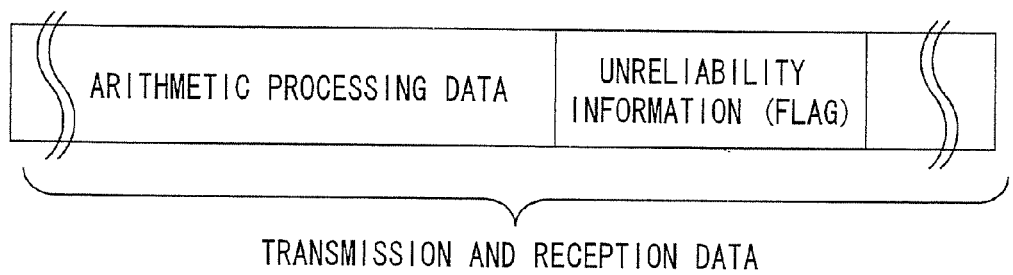
FIG. 2 is an explanatory view of a case where unreliable information to distinguish whether a control operation processing result is normal or not is added at the time of data transmission between control devices connected to a network.

Besides, the respective control devices 1a and 1b are constructed to add, at the time of data transmission, unreliable information for distinguishing whether an arithmetic processing result is reliable or not to the transmission data, for example, an unreliability flag "1" (FIG. 2) to notify that the control arithmetic results of the control devices 1a and 1b are in unreliable states.

The control device 1a is provided with a reset switch 4, and a specified control program is installed in the arithmetic control section 2a, so that a reset instruction output unit 7a and unreliable information reset unit 8a recited in the claims are constructed. Besides, in the other control device 1b, a specified control program is installed in the arithmetic control section 2b, so that a reset instruction reception monitor unit 5b and an unreliable information reset unit 8b recited in the claims are constructed.

Incidentally, the functions of the respective units constructed in the respective arithmetic control sections 2a and 2b would be gradually understood in the following explanation of the operation.

Next, the operation of the instrumentation control system having the above structure, particularly the reset operation of unreliable informations in the case where a closed loop of feedback control or the like is formed between both the control devices 1a and 1b will be described with reference to flowcharts of FIG. 3 and FIG. 4. Incidentally, in the following, reference character S denotes each process step.

Figure 3:
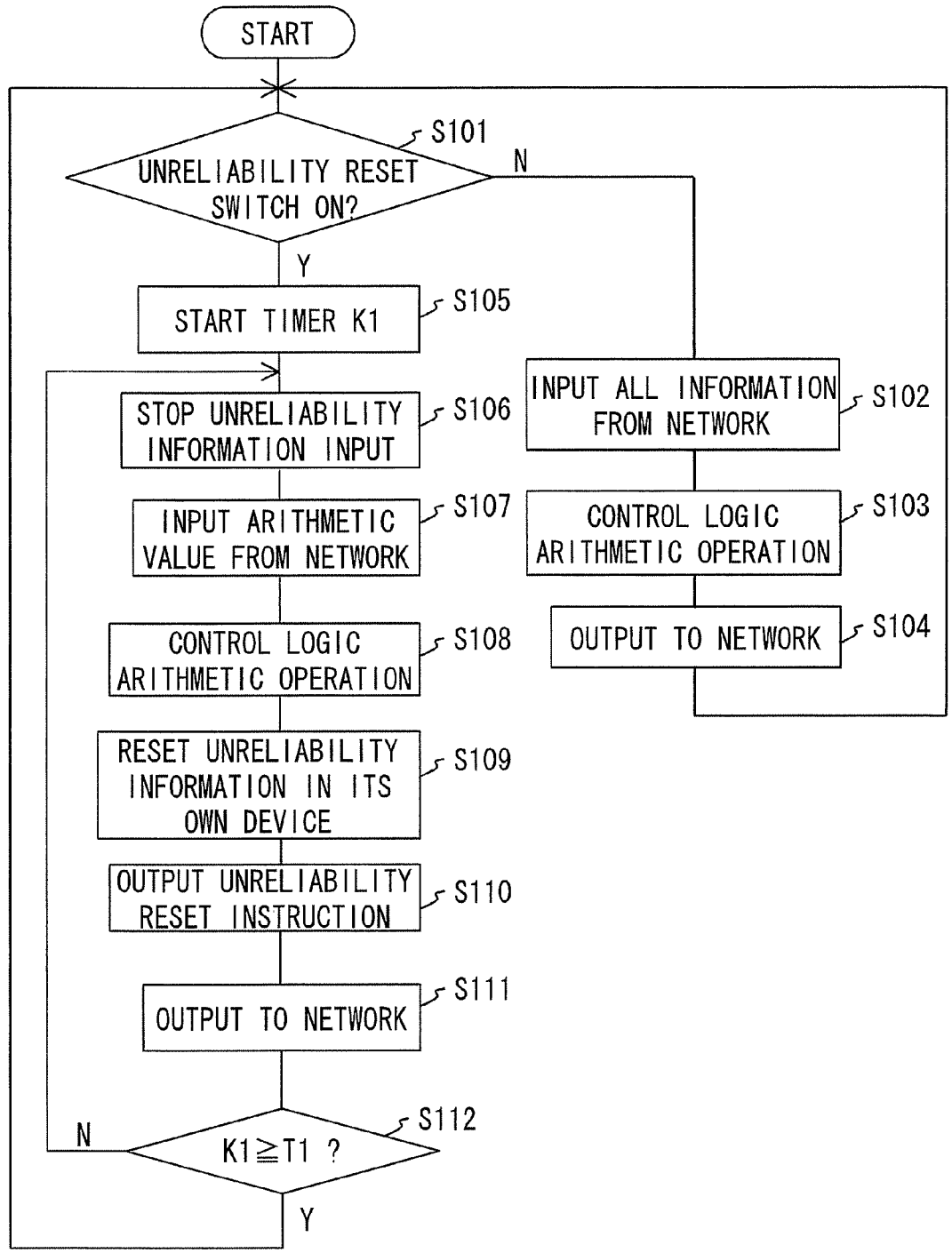
FIG. 3 is a flowchart to explain the operation of a specific control device in embodiment 1 of the invention.
Figure 4:
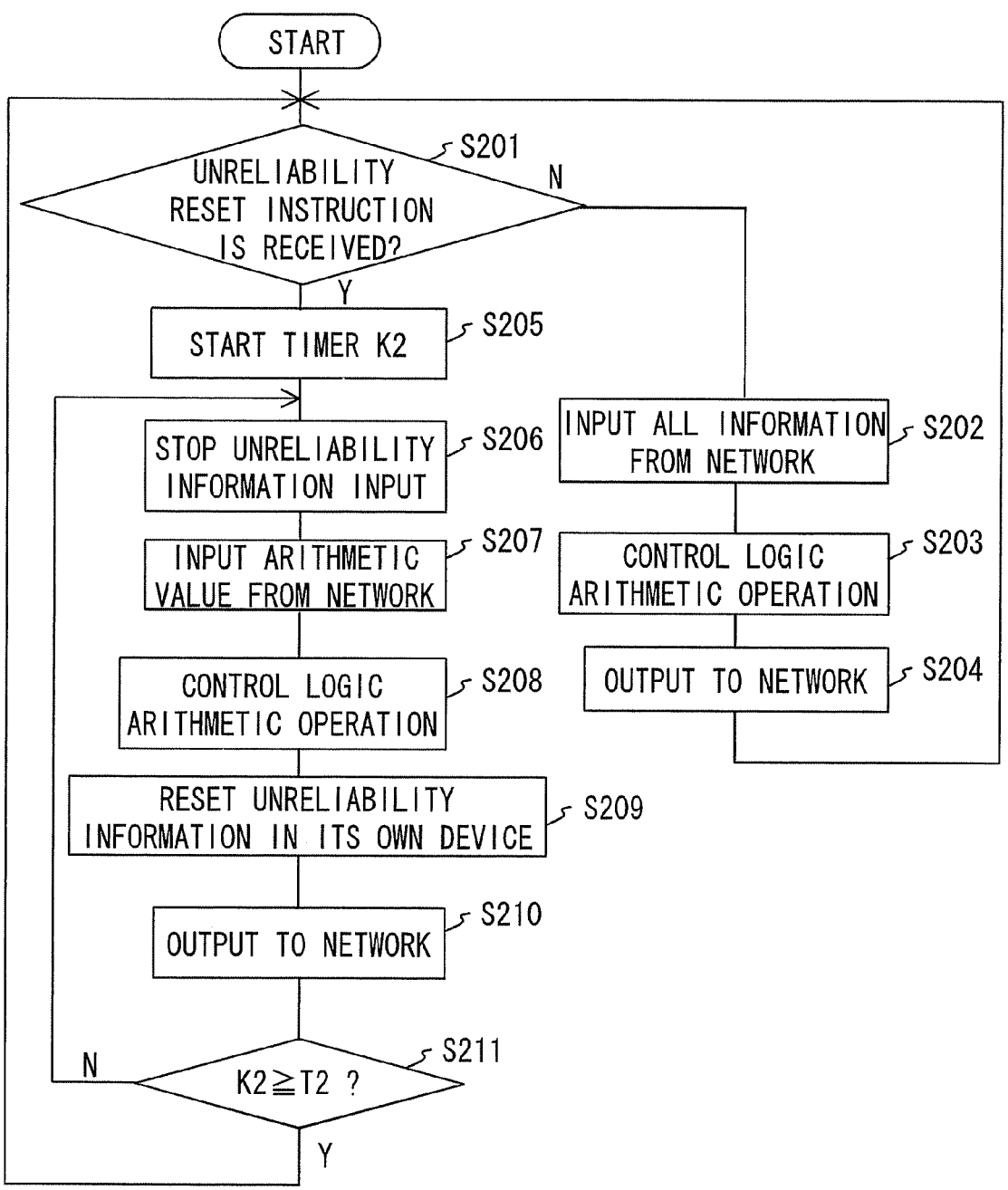
FIG. 4 is a flowchart to explain the operation of another control device in embodiment 1 of the invention.

FIG. 3 is the flowchart of the arithmetic processing operation of the control device 1a, FIG. 4 is the flowchart of the arithmetic processing operation of the other control device 1b.

First, in the control device 1a, the arithmetic control section 2a determines whether the reset switch 4 is turned on or not (S101). At this time, when the reset switch 4 is not turned on, all information inputted from the network 3 is directly inputted (S102), various control logic arithmetic operations are performed based on the arithmetic processing data from the other control device 1b included in the information (S103), and the arithmetic processing result is further outputted to the network 3 (S104). In this case, when the unreliable information is added to the data inputted from the device 1b, the unreliable information is added also to the data outputted from the device 1a.

On the other hand, when the reset switch 4 is turned on at S101, in response to this, the arithmetic control section 2a starts a timer K1 for setting an output continuation period of unreliability reset instruction (S105). Then, input of the unreliable information to this control device from the network 3 is stopped (S106), and next, the arithmetic processing data included in the reception information from the network 3 is captured (S107), and a control logic arithmetic operation is performed (S108). Next, after the unreliable information in this control device is reset by the unreliable information reset unit 8a (S109), the unreliability reset instruction is outputted by the reset instruction output unit 7a (S110), and the control logic arithmetic result and the unreliability reset instruction are outputted to the network 3 (S111). Then, it is determined whether a measured time of the timer K1 exceeds a previously set reference value T1 or not (S112), and when it does not exceed the reference value T1, process returns to S106, and when it exceeds the reference value T1, process returns to S101.

As stated above, the reason why the output process (S110) of the unreliability reset instructions by the control device 1a are continued for the definite period T1 is that since the respective control devices 1a, 1b operate asynchronously with each other, it takes a certain time after the unreliability reset instructions are outputted from the control device 1a until these are actually captured by the other control device 1b, and a surplus time for that is required.

Besides, even in the output period T1 of the unreliability reset instruction, when the control device 1a performs feedback control or the like, it is necessary that arithmetic data from the other control device 1b is inputted, the control logic arithmetic operation in the device 1a is continued, and the arithmetic result is again outputted to the other control device 1b. Thus, the processes of S107, S108 and S111 are required.

With respect to the other control device 1b, it is determined whether the reset instruction reception monitor unit 5b of the arithmetic control section 2b receives the unreliability reset instruction from the network 3 (S201). At this time, when the unreliability reset instruction is not received, all information inputted from the network 3 is directly inputted (S202), various logic arithmetic operations are performed based on the arithmetic processing data from the other control device 1a included in the information (S203), and the arithmetic processing result is outputted to the network 3 (S204). Incidentally, also in this case, when the unreliable information is added to the data inputted from the device 1a, the unreliable information is added also to the data outputted from the device 1b.

On the other hand, when the unreliability reset instruction is received at S201, in response to this, the unreliable information reset unit 8b of the arithmetic control section 2b starts a timer K2 for setting a reset continuation period of unreliable information in the control device 1b (S205). Then, input of the unreliable information from the network 3 to the device 1b is stopped (S206). Next, arithmetic processing data included in the reception information from the network 3 is captured (S207), and a control logic arithmetic operation is performed (S208). Next, after the unreliable information in the control device 1b is reset (S209), the result of the control logic arithmetic operation is outputted to the network 3 (S210). Then, it is determined whether the measured time of the timer K2 exceeds a previously set reference value T2 or not (S211), and when it does not exceed the reference value T2, process returns to S206. On the other hand, when it exceeds the reference value T2, process returns to S201.

As stated above, in the other control device 1b, the reason why the resets of the unreliable informations are continued in the control device 1b for the definite period T2 even if the unreliability reset instruction is received is as follows.

In the above example, it is assumed that only the simple data transmission is performed between the two control devices 1a and 1b. However, for example, it is supposed that still another control device 1c not shown in the drawing exists, a closed loop is formed between the control device 1c and the control device 1b, and the arithmetic period of the control device 1c is longer than the arithmetic period of the control device 1b. Then, even if the control device 1b resets the unreliable information in the control device 1b based on the unreliability reset instruction outputted from the specific control device 1a, when the unreliable information is added to data transmitted from the other control device 1c, the arithmetic result of the control device 1b becomes unreliable.

Then, in view of the fact that the control devices 1a, 1b and 1c are asynchronous with one another, even if the control device 1b does not receive a new unreliability reset instruction, the control device continues to reset the unreliable information for the previously set definite period T2 from the reception of the unreliability reset instruction. By this, it is possible to avoid a state where the data outputted from the control device 1b becomes unreliable by the unreliable information added to the data transmitted from the control device 1c.

Besides, it becomes possible to certainly reset the control device 1b.

As stated above, in this embodiment 1, the reset switch 4 is provided in the specific control device 1a, and when this reset switch 4 is depressed, all unreliable information can be certainly reset for the closed loop between the control devices 1a and 1b which are connected to each other through the network 3 and operate asynchronously.

Embodiment 2

Figure 5:
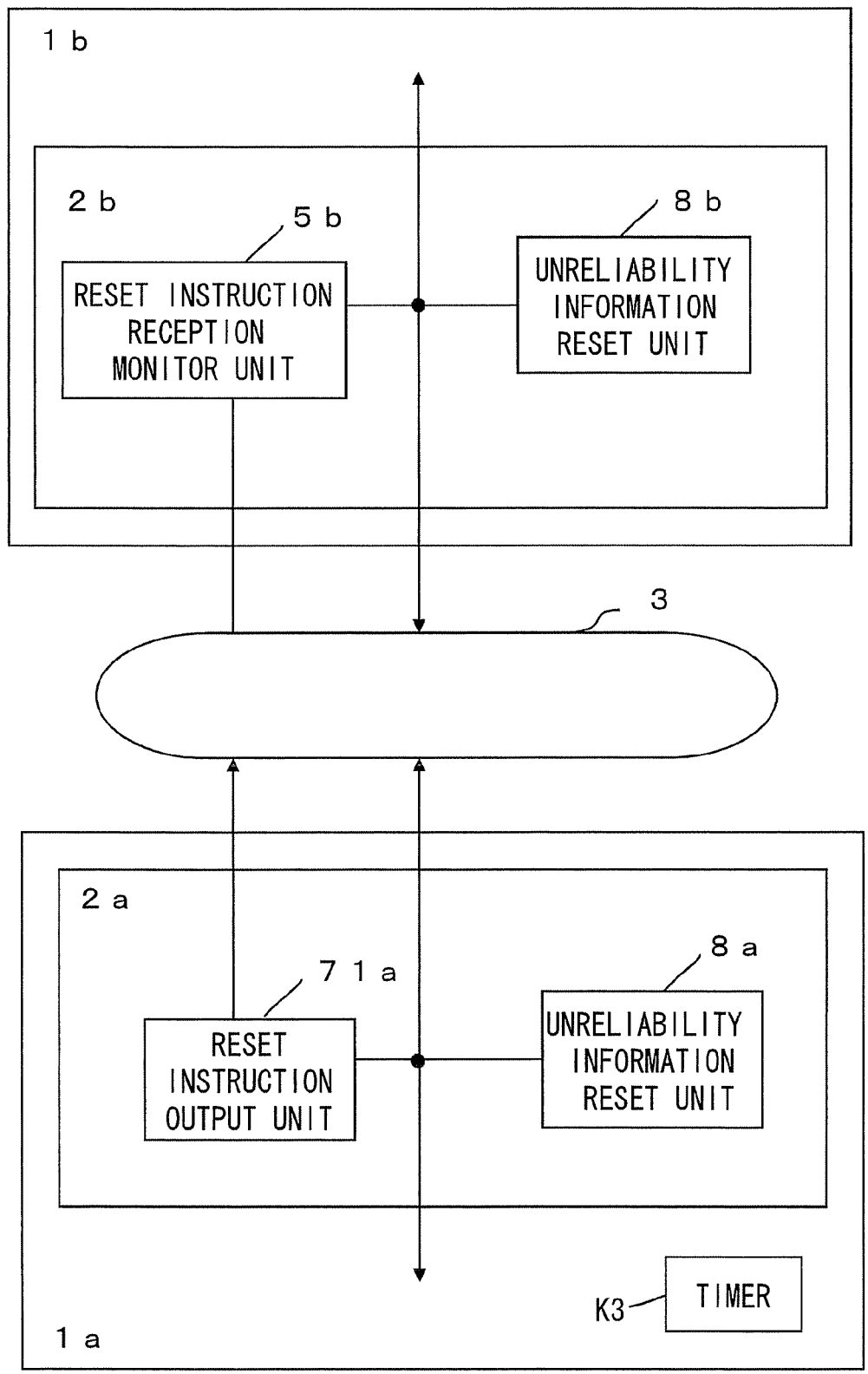
FIG. 5 is a structural view of an instrumentation control system in embodiment 2 of the invention.
Figure 6:
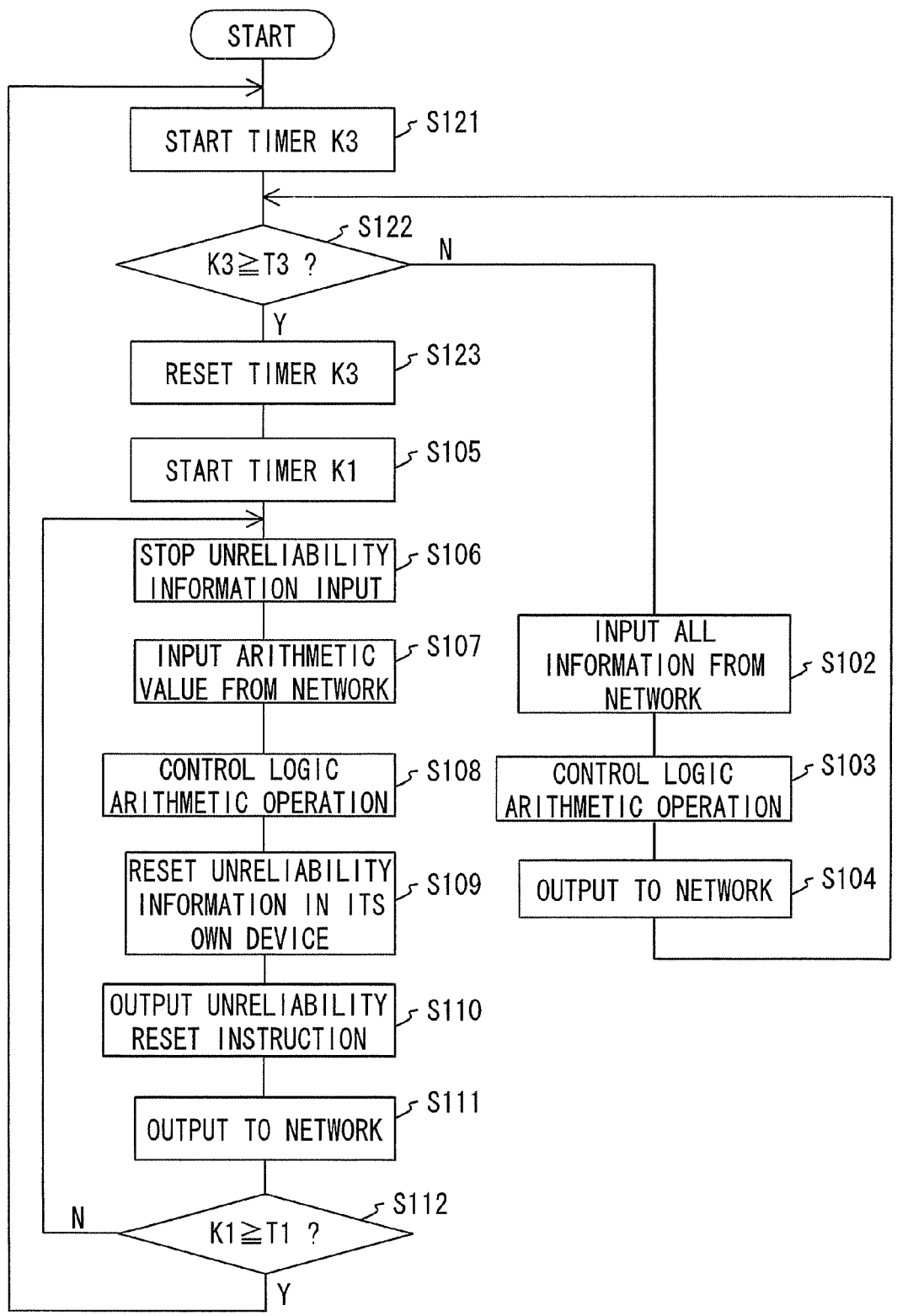
FIG. 6 is a flowchart to explain the operation of a specific control device in embodiment 2 of the invention.

FIG. 5 is a structural view of an instrumentation control system in embodiment 2 of the invention, and FIG. 6 is a flowchart to explain the operation of a specific control device.

In the above embodiment 1, the description is given to the case where the reset switch 4 provided in the specific control device 1a is depressed so that the unreliability reset instruction is outputted to the network 3. In this embodiment 2, even if the reset switch 4 is not particularly operated, a timer K3 is provided in a control device 1a, and an unreliability reset instruction is automatically outputted every time the previously set timer expires.

That is, in this embodiment 2, as shown in the system structural view of FIG. 5, the reset switch 4 is not provided in the control device 1a.

As shown in the flowchart of FIG. 6, an arithmetic control section 2a starts the timer K3 for setting an output period of unreliability reset instruction (S121). Next, it is determined whether the measured time of the timer K3 exceeds a previously set reference value T3 or not (S122). When it does not exceed the reference value T3, all information from the network 3 is directly inputted (S102), various control logic arithmetic operations are performed based on the arithmetic processing data from the other control device included in the information (S103), and the arithmetic processing result is further outputted to the network 3 (S104).

On the other hand, when the measured time of the timer K3 exceeds the previously set reference value T3 at S122, in response to this, the arithmetic control section 2a resets the count value of the timer K3 (S123), and then, starts a timer K1 for setting an output continuation period of unreliability reset instruction (S105). The input of the unreliable information to the control device 1a from the network 3 is stopped (S106), and next, arithmetic processing data included in the received information from the network 3 is captured (S107), and a control logic arithmetic operation is performed (S108). Next, after the unreliable information in the control device 1a is reset by the unreliable information reset unit 8a (S109), the unreliability reset instruction is outputted by the reset instruction output unit 71a (S110), and the control logic arithmetic result and the unreliability reset instruction are outputted to the network 3 (S111). Then, it is determined whether the measured time of the timer K1 exceeds the previously set reference value T1 or not (S112), and when it does not exceed the reference value T1, process returns to S106, and when it exceeds the reference value T1, process returns to S121.

Incidentally, the operation of the control device 1b is similar to that of the case of embodiment 1 shown in FIG. 4. Further, since the other structure is similar to that of embodiment 1, its detailed explanation will be omitted here.

As stated above, in this embodiment 2, in the specific control device 1a, every time the measured time of the timer K3 exceeds the previously set reference value T3, the unreliability reset instruction is automatically outputted from the control device 1a. Thus, it is possible to eliminate the trouble of manually operating the reset switch 4 as in embodiment 1, and surplus labor can be reduced.

Further, similarly to the case of embodiment 1, all unreliable informations in the closed loop between the respective control devices 1a and 1b which are connected to each other through the network 3 and operate asynchronously can be certainly reset.

Embodiment 3

In the above embodiments 1 and 2, when the unreliable information in the closed loop formed between the control devices operating asynchronously is reset, in view of the state of the network 3, the durations T1 and T2 to reset the unreliable information and to stop the input of the unreliable information from the network 3 are set so as to allow sufficient time. Thus, in the respective control devices 1a and 1b, although the unreliable information is substantially reset, it is necessary to continue to output the unreliability reset instruction, and the surplus time is required for the reset process.

On the other hand, in this embodiment 3, the other control device 1b resets the unreliable information in own control device, and simultaneously outputs the completion notice of the reset of the unreliable information to the control device 1a, so that the duration to keep the function stopping unreliable information transmission in the respective control devices 1a and 1b is shortened after the unreliable informations are reset. Hereinafter, a specific processing operation will be described with reference to a system structural view of FIG. 7 and flowcharts of FIG. 8 and FIG. 9.

Figure 8:
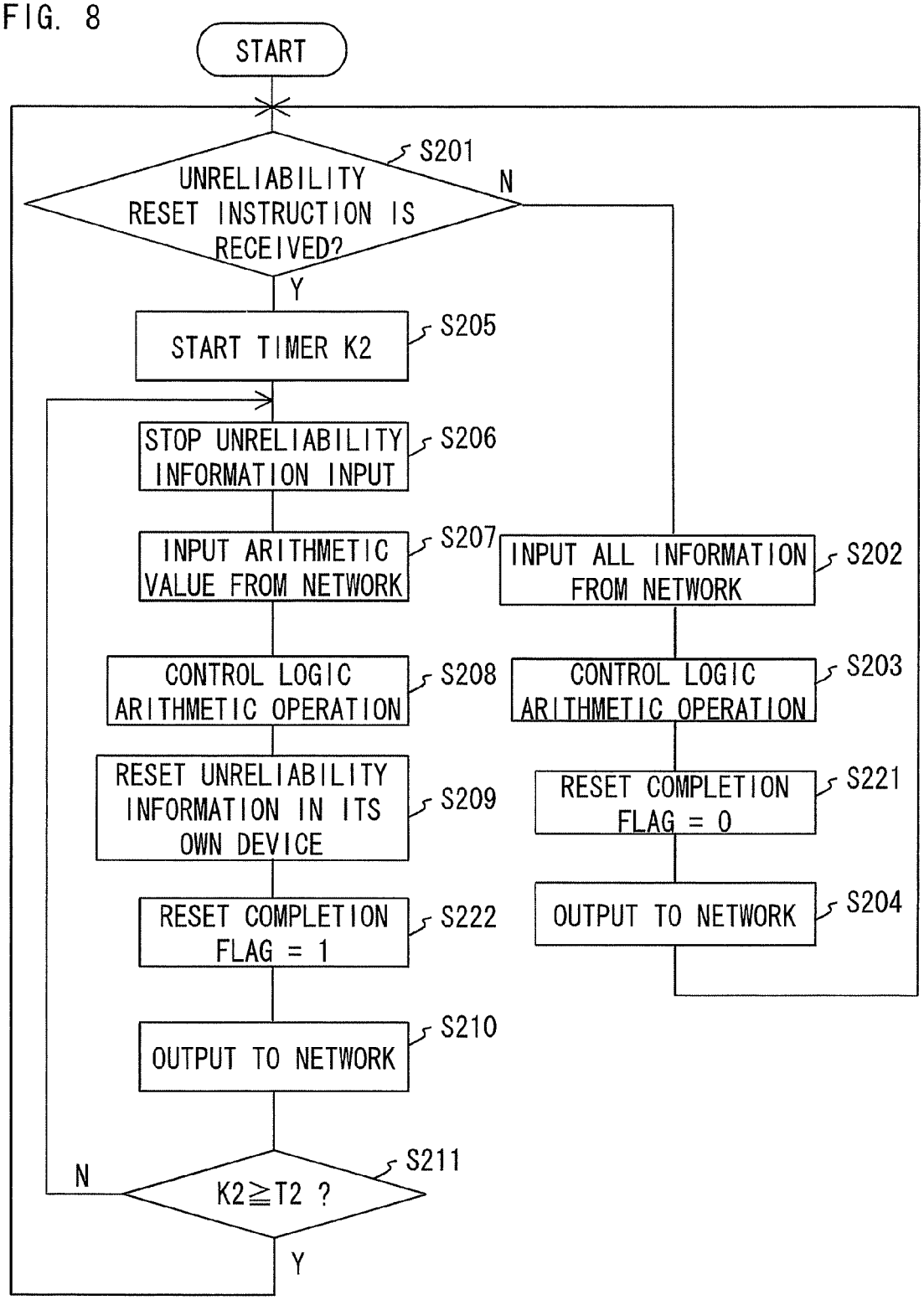
FIG. 8 is a flowchart to explain the operation of another control device in embodiment 3 of the invention.

First, here, for facilitating the understanding, the operation of the control device 1b will be first described with reference to the flowchart of FIG. 8.

In this control device 1b, when an unreliability reset instruction is received from the control device 1a (S201), similarly to the case of embodiment 1, the process of S205 to S209 is performed, and further, in this embodiment 3, next to this, a reset completion notification unit 9 issues reset completion information (for example, a reset completion flag "1") for notifying the device 1a that the reset of the unreliable information in the control device 1b is completed (S222). Then, the control logic arithmetic result and the reset completion information are outputted to the network 3 (S210).

Incidentally, also in this case, similarly to embodiment 1, in view of the fact that the respective control devices 1a and 1b are asynchronous with each other, even if a new unreliability reset instruction is not received, the device 1b continues to reset the unreliable information for a previously set definite period T2 from the reception of the unreliability reset instruction.

Figure 7:
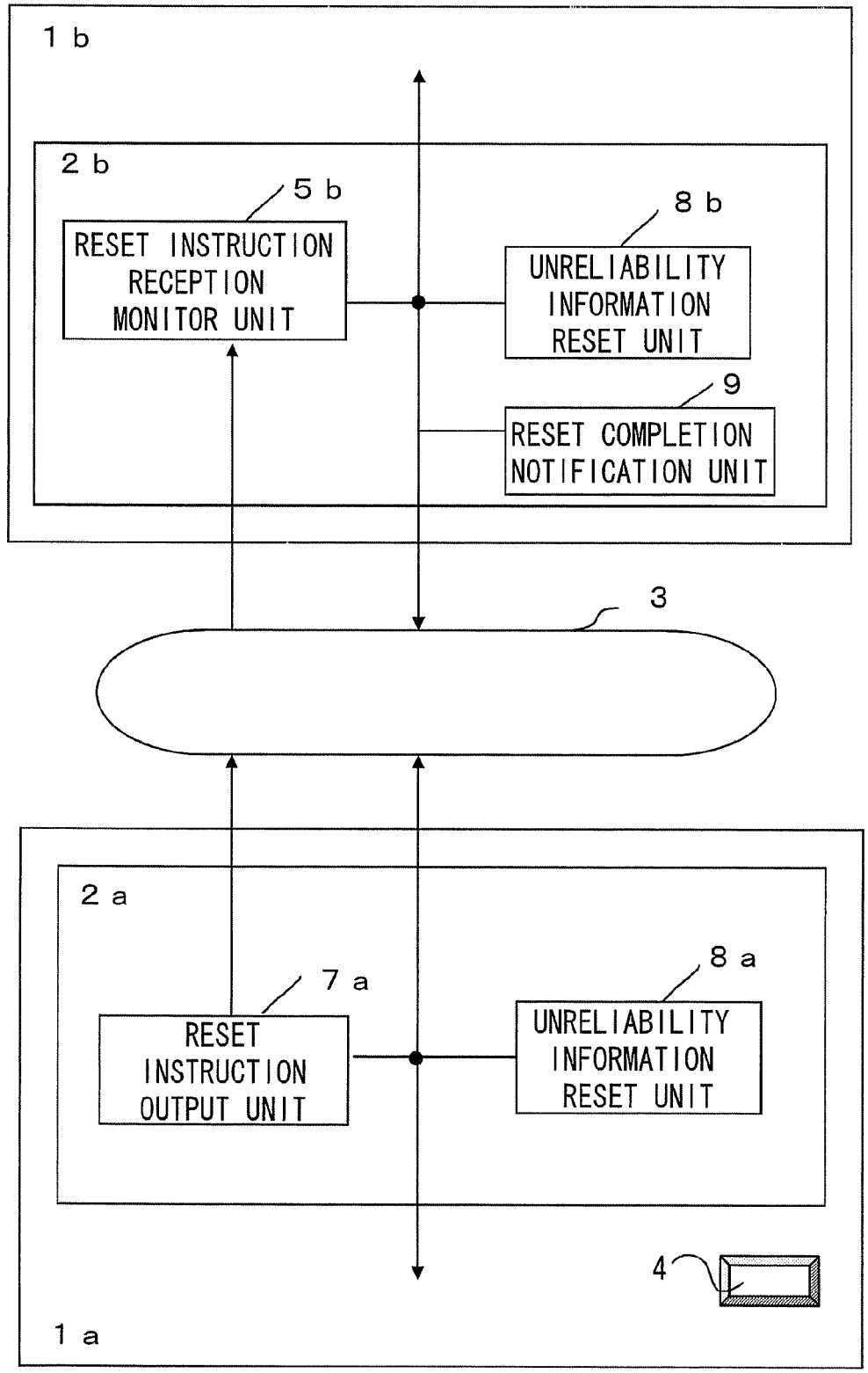
FIG. 7 is a structural view of an instrumentation control system in embodiment 3 of the invention.
Figure 9:
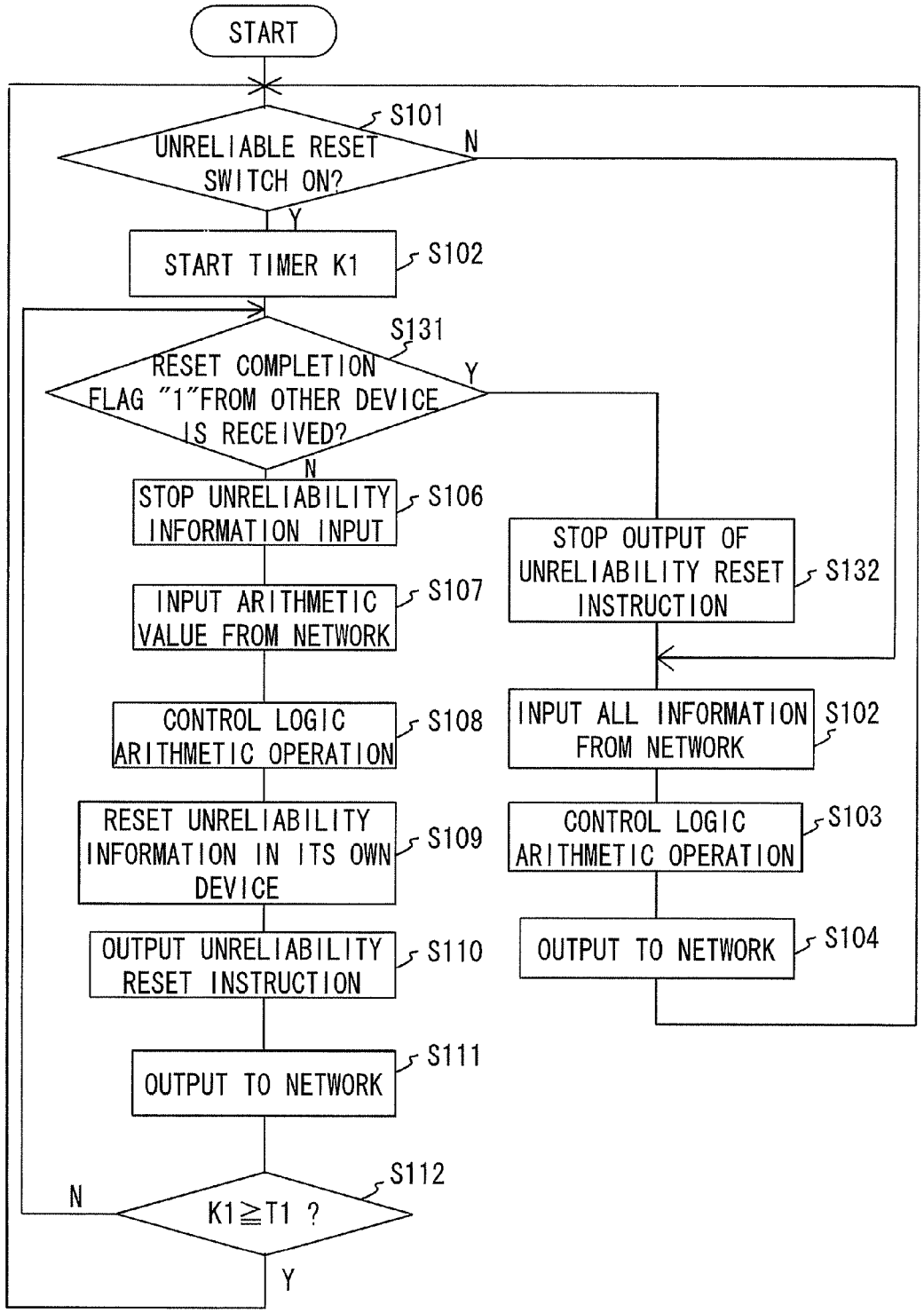
FIG. 9 is a flowchart to explain the operation of a specific control device in embodiment 3 of the invention.

On the other hand, in the control device 1a, as shown in the flowchart of FIG. 9, when the reset switch 4 of FIG. 7 is depressed (S101), a timer K1 is started, and during a period before the measured time of the timer K1 exceeds a previously set reference value T1, the process of S106 to S111 is continued until reset completion information (reset completion flag "1") is received from the control device 1b, and the unreliability reset instruction is continued to be outputted to the network 3.

However, when the reset completion information (reset completion flag "1") is received from the control device 1b in the middle of the period before the measured time of the timer K1 exceeds the previously set reference value T1 (S131), a reset instruction output unit 7a immediately stops the output of the unreliability reset instruction (S132), and process goes to S102-S104.

In this embodiment 3, although the number of other control devices 1b forming the closed loop with respect to the specific control device 1a is one, when still another control device exists, at S131, the output of the unreliability reset instruction is stopped when all reset completion informations (reset completion flag "1") from the control devices forming the closed loop except for the specific control device 1a are received (S132).

Incidentally, since other operations of the control devices 1a and 1b are similar to those of the cases of embodiment 1 shown in FIG. 3 and FIG. 4, the corresponding steps are denoted by the same reference characters, and their detailed explanation will be omitted here. Besides, since other structures are similar to those of embodiment 1, their detailed explanation are omitted.

As stated above, in this embodiment 3, with respect to the closed loop between the control devices 1a and 1b which are connected to each other through the network 3 and operate asynchronously, all unreliable informations can be certainly reset. Besides, the reset completion notification unit 9 to output the reset completion information is provided in the control device 1b, and when the reset completion information is received by the other control device 1a, in response to this, the output of the unreliability reset instruction is immediately stopped. Thus, the time required to reset the unreliable information in all the devices 1a and 1b connected to the network 3 can be shortened in total.

Incidentally, in this embodiment 3, although the description has been made on the assumption that the reset switch 4 is provided in the specific control device 1a similarly to embodiment 1, the invention is not limited to this, but can be applied to the structure in which, as in the case of embodiment 2, the unreliability reset instruction is automatically outputted from the device 1a every time the specified measured time T3 elapses.

Embodiment 4

In the above embodiments 1 to 3, at the time of construction of the instrumentation control system, the specific control device 1a to output the unreliability reset instruction is previously determined. However, in this embodiment 4, each of all control devices 1a and 1b in this system monitors the presence or absence of the unreliable information in own control device, and when it is confirmed that the unreliable informations are continuously generated for a previously set definite time T4 or more, the unreliability reset instruction can be outputted to the network 3 from either of the control devices 1a and 1b.

Independently of a specific control device, all unreliable information can be certainly reset with respect to the closed loop between the respective control devices 1a and 1b which are connected to each other through the network 3 and operate asynchronously.

That is, in this embodiment 4, the respective control devices 1a and 1b include arithmetic control sections 2a and 2b to perform various logical arithmetic operations, and specified control programs are installed in the arithmetic control sections 2a and 2b, so that a reset instruction reception monitor unit 5, an unreliable information monitor unit 6, a reset instruction output unit 7 and an unreliable information reset unit 8 recited in the claims are constructed.

Incidentally, the functions of the respective units included in the respective arithmetic control sections 2a and 2b would be understood from the following explanation of the operations.

Figure 10:
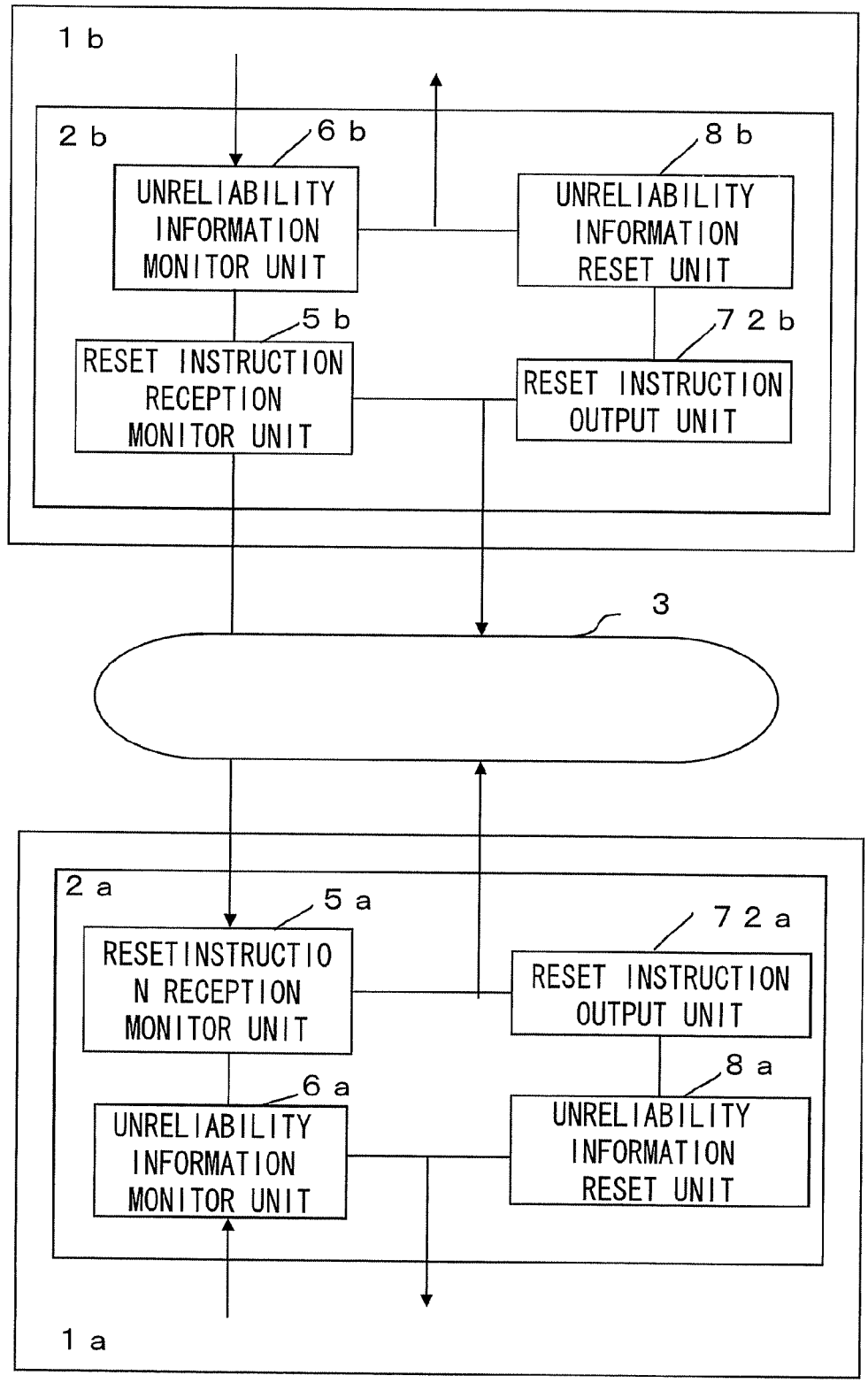
FIG. 10 is a structural view of an instrumentation control system in embodiment 4 of the invention.

Next, in the instrumentation control system having the above structure, the reset operation of unreliable information in the case where the closed loop of feedback control or the like is formed between the control devices 1a and 1b will be mainly described with reference to a structural view of the system shown in FIG. 10 and a flowchart shown in FIG. 11.

Figure 11:
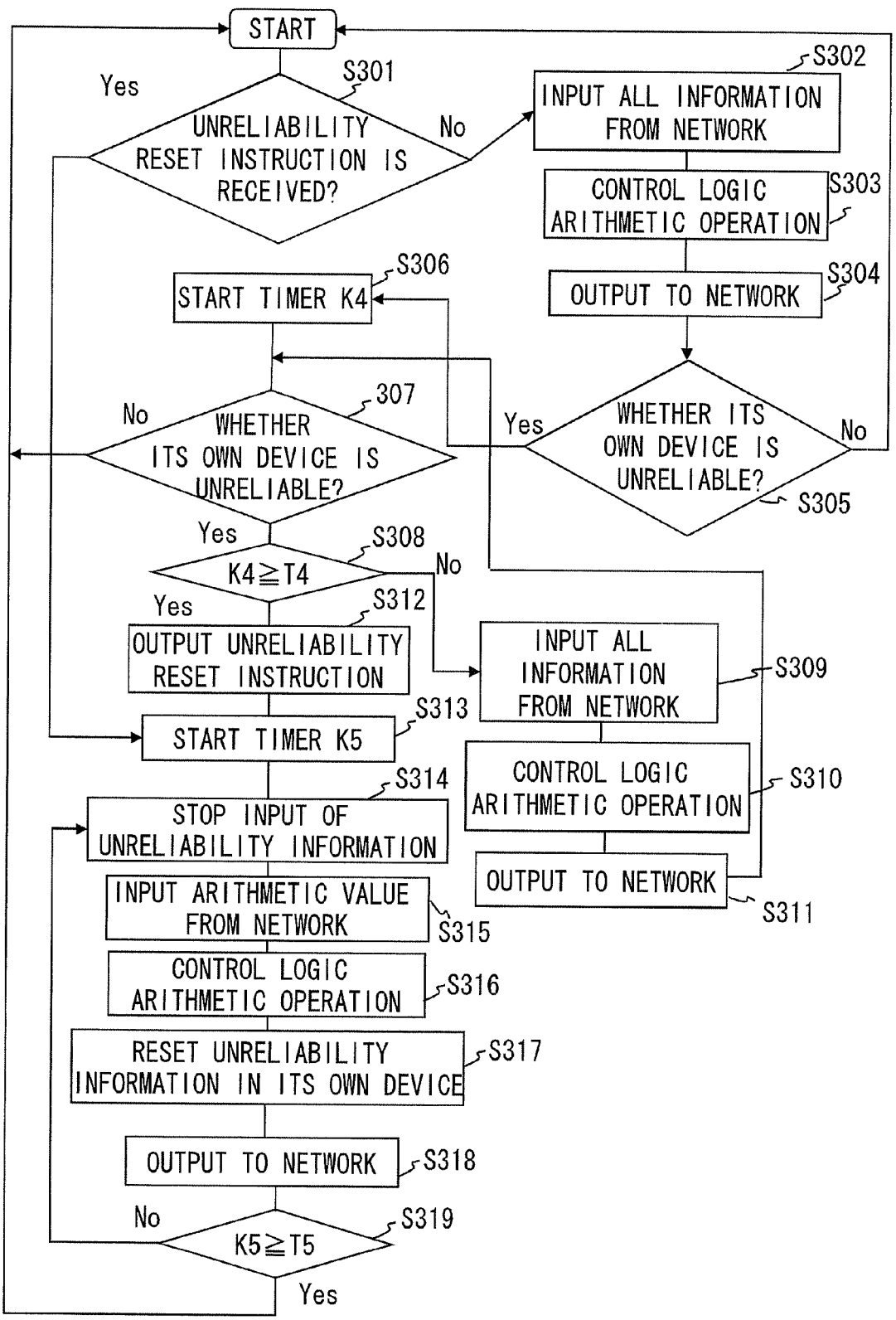
FIG. 11 is a flowchart to explain the operation of respective control devices in embodiment 4 of the invention.

Incidentally, the process shown in the flowchart of FIG. 11 is applied to both of the control devices 1a and 1b.

First, the reset instruction reception monitor unit 5a, 5b of the arithmetic control section 2a, 2b determines whether an unreliability reset instruction is received from the other control device or not (S301). When the unreliability reset instruction is received, process goes to step S313. This process will be described later. When the unreliability reset instruction is not received from the other control device, all information (data and flags) from the network 3 is directly inputted (S302), various control logic arithmetic operations are performed based on the arithmetic processing data from the other control device included in the information (S303), and the arithmetic processing results are further outputted to the network 3 (S304).

Next, the unreliable information monitor unit 6a, 6b monitors the unreliable informations in own control device, and determines whether the state is such that the unreliable information is added to the data outputted to the network 3 from this control device or not (S305).

When the condition is satisfied, process goes to S306, and when not satisfied, process returns to S301, and the series of operations are repeated.

When the state is such that the unreliable information is added to the output data to the network 3 from this control device, a timer K4 for monitoring unreliability continuation time is started (S306).

Next, at step S307, it is again determined that this control device is in the state of adding the unreliable information. When this step is processed for the first time, since it is determined at step S305 that, this control device is in the state of adding the unreliable information, this condition is always satisfied and process goes to step S308.

After the timer K4 is started, the loop from step S307 to S311 is repeated for a definite time (T4). The process from step S309 to S311 is similar to the process of S302 to S304.

While the process from S307 to S311 is repeated, when the state in which the unreliable information is added to the data outputted by this control device is eliminated, process returns to step S301 from step S307.

On the contrary, when the state in which the unreliable information is added to the data outputted by this control device continues even after the definite time (T4) elapses, process goes to next step S312.

The reset instruction output unit 72a, 72b outputs the unreliability reset instruction to the other control device (S312).

When the data added with the unreliable informations are continuously outputted for the definite time from this control device, it is conceivable that the data of the other control device are also in the state of including the unreliable informations. Then, the unreliability reset instruction is outputted to all the relevant control devices connected to the network 3.

After the unreliability reset instruction is outputted to the other control device, the unreliable information reset unit 8a, 8b performs a process to reset the unreliable informations in this control device after step S313.

First, a timer K5 for setting duration in which the unreliable information reset process is continued is started (S313), and the input of the unreliable information, which is added to the data inputted from the other control device, to this control device is stopped (S314). Next, arithmetic processing data included in the received information from the network 3 is captured (S315), and a control logic arithmetic operation is performed (S316). Further, after the unreliable informations in this control device are reset by the unreliable information reset unit 8a, 8b (S317), the control logic arithmetic result is outputted to the network 3 (S318).

When the value of the timer K5 is less than a definite time (T5), process returns to S314, and the same process is continued, and when timer shows T5 or more, the process returns to S301.

As stated above, in this embodiment 4, the unreliable informations in each control devices are always monitored, and when the state in which the unreliable information is added to the output data from own control device to the network 3 continues for the definite time T4 or more, the unreliability reset instruction is outputted to the other control device, and the unreliable informations of own control device are also continuously reset for the definite time.

Besides, also when the unreliability reset instruction is received from the other control device, and also when the unreliable informations of own control device are reset after the control device outputs the unreliability reset instruction to the other control device, the process of the arithmetic control section of each device repeats the reset of the unreliable informations in own control device for the definite time T5. Accordingly, it is possible to certainly prevent the occurrence of the state in which the same device continuously delivers the unreliability reset instructions, and the same instructions are repeated to the network 3 and collide with each other, and the reset of the unreliable informations are not well performed.

In this embodiment 4, the control device to issue the unreliability reset instruction is not limited to the specific device unlike embodiments 1 to 3, and the unreliability reset instruction can be outputted from the arbitrary control device 1a or 1b as the starting point of the occurrence of the unreliable information. Thus, even in the case where there occurs a state in which a specific control device is separated from the network 3 because of the failure or maintenance, the reset of the unreliable informations can be automatically and certainly performed for the closed loop of the remaining control devices. Besides, in the hierarchized network 3, it is supposed that there occurs a state in which the network is divided into plural networks 3. Also in such a case, since the control device to issue the unreliability reset instruction is not limited to the specific device, it becomes possible to avoid such a state that the reset of the unreliable informations of the closed loop formed on the divided networks 3 can not be performed, and shows a good performance.

Various modifications and alterations of this invention will be apparent to those skilled in the art without departing from the scope and spirit of this invention, and it should be understood that this is not limited to the illustrated embodiments set forth herein.

What is claimed is:

1. An instrumentation control system comprising a plurality of control devices performing control arithmetic processings and being connected to each other through a network wherein the respective control devices perform a data transmission through the network asynchronously with each other, and an unreliable information to distinguish whether a result of the control arithmetic processing is reliable or not is added at a time of data transmission, and wherein
one control device from the plurality control devices includes:
a reset switch;
a reset instruction output unit to output an unreliability reset instruction to reset the unreliable information to the network for a preset period in response to an operation of the reset switch; and
an unreliable information reset unit to stop input of the unreliable information from another control device for a preset period in response to the operation of the reset switch and to reset the unreliable information in said one control device, and
a remaining control device from the plurality of control devices includes:
a reset instruction reception monitor unit to monitor whether an unreliability reset instruction is received through the network or not; and
an unreliable information reset unit to stop, when an unreliability reset instruction is received, input of the unreliable information from another control device for a preset period and to reset the unreliable information in said remaining control device.

2. The instrumentation control system according to claim 1, wherein the reset instruction output unit is further configured to automatically output an unreliability reset instruction to reset the unreliable information to the network for a preset period periodically with specified intervals.

3. The instrumentation control system according to claim 2, wherein
the remaining control device further includes a reset completion notification unit to output, when the unreliable information in the remaining control device is reset by the unreliable information reset unit of the remaining control device, reset completion information to the network, wherein
the reset instruction output unit of the remaining control device immediately stops output of the unreliability reset instruction to the network when the reset completion information outputted from the reset completion notification unit is inputted through the network.

4. The instrumentation control system according to claim 1, wherein
the remaining control device further includes a reset completion notification unit to output, when the unreliable information in the remaining control device is reset by the unreliable information reset unit of the remaining control device, reset completion information to the network, wherein
the reset instruction output unit of the remaining control device immediately stops output of the unreliability reset instruction to the network when the reset completion information outputted from the reset completion notification unit of the remaining control device is inputted through the network.

5. An instrumentation control system comprising a plurality of control devices performing control arithmetic processings and being connected to each other through a network wherein the respective control devices perform data transmission through the network asynchronously with each other, and unreliable information to distinguish whether a result of the control arithmetic processing is reliable or not is added at a time of a data transmission, and wherein
each of the control devices includes:
an unreliable information monitor unit to monitor whether unreliable information is to be added to output data from own control device to the network or not;
a reset instruction reception monitor unit to monitor whether an unreliability reset instruction to reset unreliable information is received from another control device through the network or not;
a reset instruction output unit to output the unreliability reset instruction to the network when unreliable information is detected continuously by the unreliable information monitor unit for a preset time; and
an unreliable information reset unit to stop input of unreliable information from another control device to own control device for a preset period and to reset unreliable information in own control device after the reset instruction output unit of own control device outputs the unreliability reset instruction to the network, or when the reset instruction reception monitor unit detects that the unreliability reset instruction is received through the network.

* * * * *